No. 863,450. PATENTED AUG. 13, 1907.
J. M. ROSENBLATT.
MEANS FOR AUTOMATICALLY CONTROLLING THE SUPPLY OF AIR TO ORGAN WIND CHESTS.
APPLICATION FILED MAR. 25, 1907.

Witnesses
F. L. Ourand
W. Parker Reinohl

Inventor
J. M. Rosenblatt.
By D. L. Reinohl.
Attorney

THE NORRIS PETERS CO., WASHINGTON, D. C.

UNITED STATES PATENT OFFICE.

JOHN M. ROSENBLATT, OF GREENSBORO, NORTH CAROLINA, ASSIGNOR OF ONE-HALF TO JULIUS W. CONE, OF GREENSBORO, NORTH CAROLINA.

MEANS FOR AUTOMATICALLY CONTROLLING THE SUPPLY OF AIR TO ORGAN WIND-CHESTS.

No. 863,450.　　　　Specification of Letters Patent.　　　　Patented Aug. 13, 1907.

Application filed March 25, 1907. Serial No. 364,299.

*To all whom it may concern:*

Be it known that I, JOHN M. ROSENBLATT, a citizen of the United States, residing at Greensboro, in the county of Guilford and State of North Carolina, have invented certain new and useful Improvements in Means for Automatically Controlling the Supply of Air to Organ Wind-Chests; and I do hereby declare the following to be a full, clear, and exact description of the invention, such as will enable others skilled in the art to which it appertains to make and use the same.

My invention relates primarily to organ wind chests or boxes, has for its object economy in power and the maintenance of the supply of air at approximately the same degree of pressure, and the invention consists in certain improvements for the purpose which will be fully disclosed in the following specification and claims.

Figure 1:
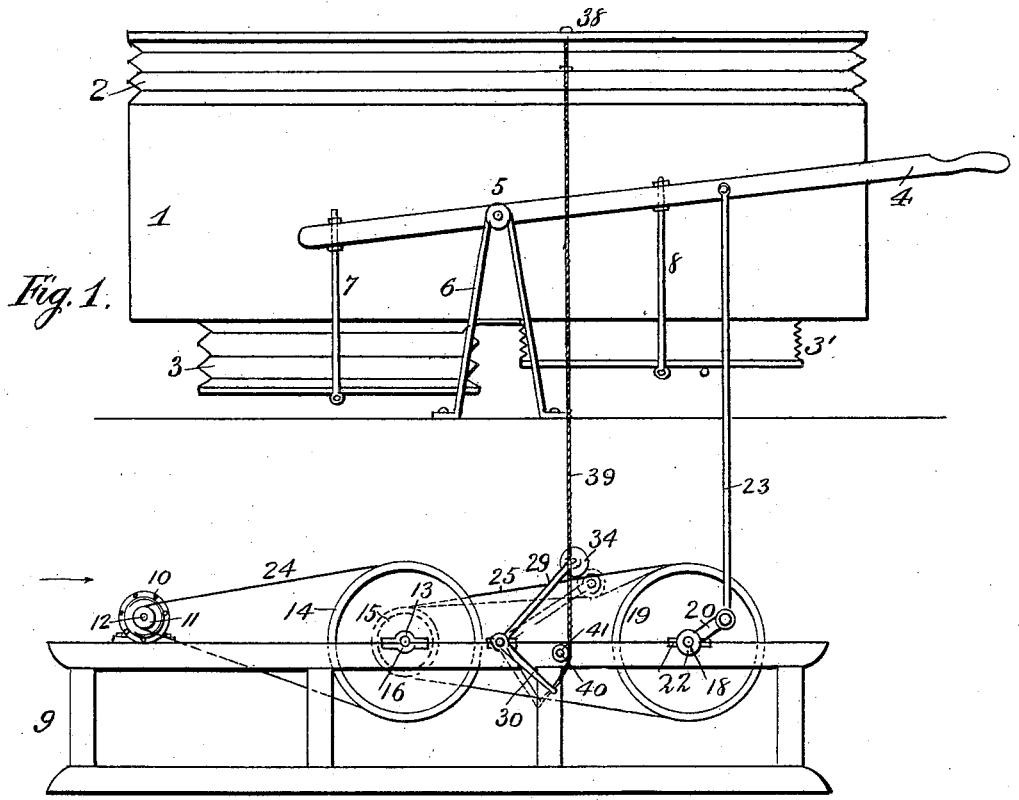
Figure 2:
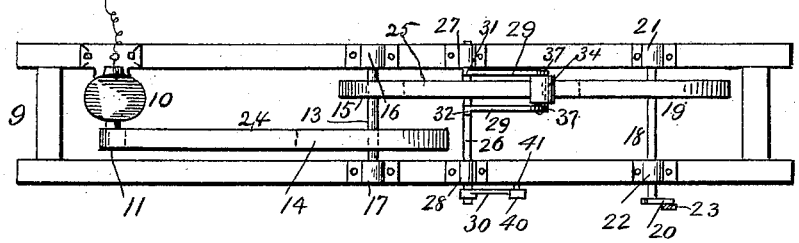
Figure 3:
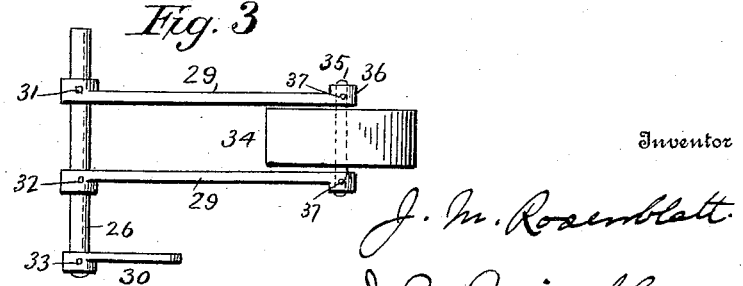

In the accompanying drawings, which form part of this specification:—Figure 1 represents a side elevation of a wind chest and a motor provided with my invention. Fig. 2 a top plan view of the motor and its attachments for supplying wind to the wind box, and Fig. 3 an end view of the belt tightener detached and on an enlarged scale.

Reference being had to the drawings and the designating characters thereon, the numeral 1 indicates the wind-chest, 2 the expansible and contractible or flexible section thereof, 3, 3' the bellows, 4 the lever for operating the bellows by hand, fulcrumed at 5 on a strut 6 and having rods 7, 8 attached to the lever and to the bellows 3, 3' in the usual manner. The wind-chest and its operating devices described are of the ordinary and well known construction to be operated by manual labor.

9 indicates a frame, 10 a motor, preferably electric, having a pulley 11 on the shaft 12. 13 a shaft supporting pulleys 14, 15, and journaled in bearings 16, 17 on the horizontal members of the frame.

. 18 is a shaft supporting a pulley 19, and a crank arm 20, and is journaled in bearings 21, 22, and the crank arm 20 is connected to the lever 4 by a rod 23.

The pulley 11 on the motor shaft 12 is connected to the pulley 14 by a taut belt 24, and the pulley 15 is connected to the pulley 19, by a slack belt 25, as shown in Fig. 1 of the drawings, so that the belt 25 will run on the pulley 19 without driving it when the belt is slack.

A shaft 26, journaled in bearings 27, 28 supports parallel arms 29, 29, and an arm 30 all of which arms are adjustable on the shaft and secured thereto by set screws 31, 32 and 33, and between the outer ends of the arms 29 a pulley 34 is revolubly supported on a shaft 35 having bearings 36, 36 on the arms 29, and in which bearings the shaft is secured by set screws 37, 37. The loose pulley 34 engages or rests upon the belt 25, and the arm 30 is connected to the upper end of the expansible and contractible section 2 of the wind chest 1 at 38 by a flexible chain, cord or rope 39, which passes over a revoluble pulley 40 on shaft 41 secured to one of the horizontal members of the frame 1. The arms 29 supporting the pulley 34, and the arms 30 are set at such an angle to each other that when the section 2 of the wind chest contracts by reason of the air having been supplied to the organ, the pulley 34 will have descended on the belt 25 and taken up the slack in the belt and start the bellows to pumping air, and as the section 2 becomes inflated, the cord 39 secured to the arm 30 raises the arms 29, 29 and the pulley 34, and allows the belt to become slackened gradually until the section 2 is inflated to its full capacity, when the pulley 34 will have been raised to its highest point and the belt slips on the pulleys 15, and 19, without operating the bellows until the section 2 again begins to collapse or contract, thus automatically maintaining the requisite supply of air in the wind chest with the minimum expenditure of power to operate the bellows.

Having thus fully described my invention, what I claim is,

1. In apparatus of the class described, a motor, pulleys connected to the motor, a belt between two of the pulleys, an air pump, connections between the shaft of one of the pulleys and the pump, a shaft supporting a pulley engaging said belt, a wind chest, and connections between the latter shaft and the wind chest.

2. In apparatus of the class described, a frame, a motor, pulleys connected to the motor, a slack belt between two of the pulleys, an air pump, connections between the shaft of one of the pulleys and the pump, a shaft supporting a pulley engaging said belt, said motor, shafts and pulleys being supported on said frame, a wind chest having an expansible and contractible section, and connections between the latter shaft and the aforesaid section of the wind chest.

3. In apparatus of the class described, a frame, a motor, pulleys connected to the motor, a belt between two of the pulleys, a bellows, a lever connected to the bellows, connections between said lever and the shaft of one of the pulleys, a shaft supporting a pulley engaging said belt, and provided with an arm, said motor, shafts and pulleys being supported on said frame, a wind chest having an expansible and contractible section, and a connection between said arm and said section of the wind chest.

In testimony whereof I affix my signature, in presence of two witnesses.

JOHN M. ROSENBLATT.

Witnesses:
　CHARLES E. MOORE,
　CHAS. T. FULLER.